(12) United States Patent
Frankel et al.

(10) Patent No.: US 6,496,297 B1
(45) Date of Patent: Dec. 17, 2002

(54) DEVICE AND METHOD FOR MODULATING AN OPTICAL SIGNAL

(75) Inventors: Michael Y. Frankel, Baltimore, MD (US); Jose E. Roman, Annapolis, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/746,833

(22) Filed: Dec. 22, 2000

(51) Int. Cl.[7] .............. G02F 1/01; G02F 1/29; H04J 14/02
(52) U.S. Cl. .......... 359/279; 359/276; 359/316; 359/130
(58) Field of Search ............ 359/279, 237, 359/238, 326, 190, 316, 124, 174, 175, 127, 130, 133, 276; 332/144, 145; 285/1, 2, 39; 455/42; 385/1, 2, 39, 3, 24, 27

(56) References Cited

U.S. PATENT DOCUMENTS

| | | | | |
|---|---|---|---|---|
| 5,596,667 A | * | 1/1997 | Wantanabe | 385/122 |
| 5,694,408 A | * | 12/1997 | Bott et al. | 372/6 |
| 5,726,784 A | * | 3/1998 | Alexander et al. | 359/125 |
| 5,920,588 A | * | 7/1999 | Watanabe | 372/96 |
| 6,259,836 B1 | * | 7/2001 | Dodds | 385/24 |
| 2001/0013934 A1 | * | 8/2001 | Varnham et al. | 356/478 |

FOREIGN PATENT DOCUMENTS

EP 792069 A2 * 8/1997

* cited by examiner

Primary Examiner—Jordan Schwartz
Assistant Examiner—William Choi
(74) Attorney, Agent, or Firm—David L. Soltz; Michael R. Cammarata

(57) ABSTRACT

An optical device for modulating optical signals in a wavelength division multiplexed communication system. The device includes a plurality of phase modulators. Each of the phase modulators is configured to provide an associated phase modulated optical signal. Each of a plurality of optical filters receives an associated one of the optical signals and is configured to amplitude modulate the optical signal as an optical filter output signal. The optical filter output signals may be combined onto an aggregate path to a receiver including receiver optical filters for selecting the transmitted channels.

26 Claims, 4 Drawing Sheets

DEVICE AND METHOD FOR MODULATING AN OPTICAL SIGNAL

FIELD OF THE INVENTION

The present invention is directed to a system and method for modulating data on an optical signal for transmission in an optical network.

BACKGROUND OF THE INVENTION

Fiber-optic communication networks are experiencing rapidly increasing deployment. Especially rapid is the growth of network segments that carry multi-gigabit digital data on multiple wavelengths over a single fiber strand. Such segments are predominantly comprised of point-to-point fiber-optic links. Data-modulated optical signals originated at one end propagate through the fiber medium to the opposite end.

The dominant data modulation format in optical systems has been non-return to zero on-off keying (NRZ-OOK). In an NRZ-OOK format a binary 'one' is represented by light being 'on' and a binary 'zero' by light being 'off'. This format exhibits good spectral efficiency in multi-wavelength systems, sufficient distance capability, and straightforward implementation.

When longer transmission distances are required, such as in submarine and long-haul terrestrial fiber-optic links, the NRZ-OOK format is typically modified by returning the 'one' level to 'zero' within each bit period (RZ-OOK), and possibly by adding some amount of optical phase modulation to each bit. This modulation format shows an enhanced distance reach, at the expense of more complicated components and reduced spectral efficiency.

The industry has explored other modulation formats that would allow for an increase in spectral efficiency by permitting denser packing of wavelength channels. While this does typically reduce transmission distance before electrical regeneration is required, many terrestrial links are already length-limited by network design constraints. Also, one of the fundamental limitations to this approach is the occurrence of direct cross talk between adjacent channels due to their spectral characteristics and to the finite rejection of selector filters.

One format attempting to reduce spectral bandwidth is known as multi-level (M-level) amplitude-shift keying (ASK) modulation. This produces optical spectrum compression by a factor of approximately $\log_2$ (M). The drawback is a rather severe degradation in susceptibility to noise produced by optical amplifiers, to the point of imposing unachievable optical noise characteristics. This method also requires receivers with multiple decision levels, which is a difficult accomplishment at gigabit bit rates.

Phase-shaped binary transmission (PSBT) is another approach to improving spectral efficiency. PSBT leaves some residual optical power in the 'zero' bit, but imposes a 'π' phase shift at the center of this bit. This reduces optical bandwidth by a factor of about 2, and increases spectral efficiency by a factor of about 1.5 compared to conventional OOK systems. The PSBT format also provides for an improved tolerance to dispersion. The tradeoff, however, is that PSBT uses a transmitter that typically requires radio frequency (RF) signal processing. Also, PSBT requires signal matching to both arms of a Mach-Zehnder modulator.

Frequency-division multiplexing is a technique commonly used in the cable industry for transmission of multiple Megahertz-range data signals. Each Megahertz-range data stream is modulated onto an independent RF carrier and combined with other such signals in the RF domain. The composite signal then modulates an optical carrier. Such system can achieve very high spectral efficiency, but, as with the multi-level modulation, the performance penalties make it impractical for long-distance gigabit transport.

Accordingly, there is a need in the art for a system and method of modulating an optical signal that provides high channel density, i.e. spectral efficiency, and excellent signal transmission performance in multi-wavelength optical communication systems.

SUMMARY OF THE INVENTION

The present invention is organized about the concept of achieving, among other benefits, high spectral efficiency through use of a combination of phase and amplitude modulation. In particular, an optical device consistent with the invention includes a plurality of phase modulators, each of which is configured to provide an associated phase modulated optical signal; and a plurality of optical filters. Each of the filters receives an associated one of the optical signals and is configured to provide an amplitude modulated optical signal as an optical filter output signal.

An optical communication system consistent with the invention may include a plurality of phase modulators, each of which is configured to provide an associated phase modulated optical signal representing an associated data signal; and a plurality of transmitting optical filters. Each of the transmitting filters receives an associated one of the optical signals and amplitude modulates the signal as a transmitting filter output signal. At least one optical combiner receives a plurality of the transmitting filter output signals and transmits the transmitting filter output signals on an optical signal path as an aggregate signal. Each of a plurality of receiving optical filters receives at least a portion of the aggregate signal. Each filter is configured to provide an output signal comprising an associated one of the transmitting filter output signals.

A method of modulating a plurality of optical wavelengths in a wavelength division multiplexed optical communication system consistent with the invention includes: phase modulating each wavelength based on an associated data signal to provide an associated phase modulated signal; and coupling each phase modulated signal to an associated optical filter configured to provide an amplitude modulated optical signal based on an amplitude response of the filter.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
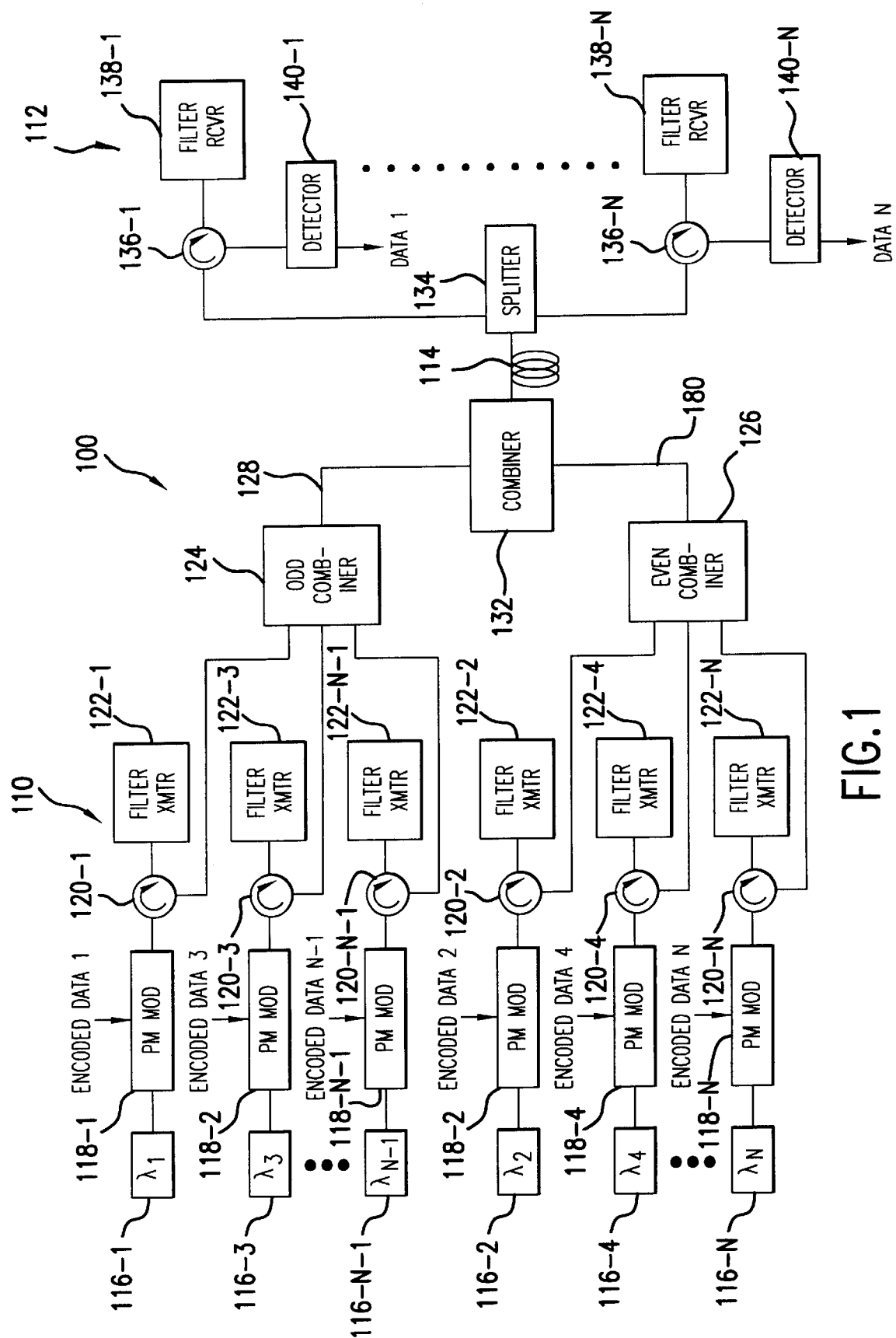
FIG. 1: is a schematic illustration of an exemplary system consistent with the present invention.

FIG. 1 illustrates a wavelength division multiplexed (WDM) system 100 consistent with the present invention. Those skilled in the art will recognize that, for ease of explanation, the system 100 has been depicted as a highly simplified point-to-point system wherein communication is from a transmitting node 110 to a receiving node 112 via a fiber span 114. It is to be understood, therefore, that FIG. 1 is provided for illustrative purposes only, and that the principles of the present invention may be incorporated into a wide variety of optical systems, devices, and network configurations.

In the illustrated embodiment, the transmitter node 110 includes a plurality of optical wavelength transmitters 116-1 to 116-N, e.g. continuous laser sources, each emitting a respective one of a plurality of optical channels, each at a corresponding one of wavelengths $\lambda 1$ to $\lambda N$. Wavelengths $\lambda 1, \lambda 3 \ldots \lambda N\text{-}1$, e.g. the odd numbered channels, are supplied on respective optical communication paths to associated phase modulators 118-1, 118-3 . . . 118-N-1, respectively. Wavelengths $\lambda 2, \lambda 4 \ldots \lambda N$, e.g. the even numbered channels, are supplied on respective optical communication paths to associated conventional phase modulators 118-2, 118-4 . . . 118-N, respectively. A variety of conventional phase modulator configurations useful in connection with the present invention will be known to those skilled in the art.

Figure 2:
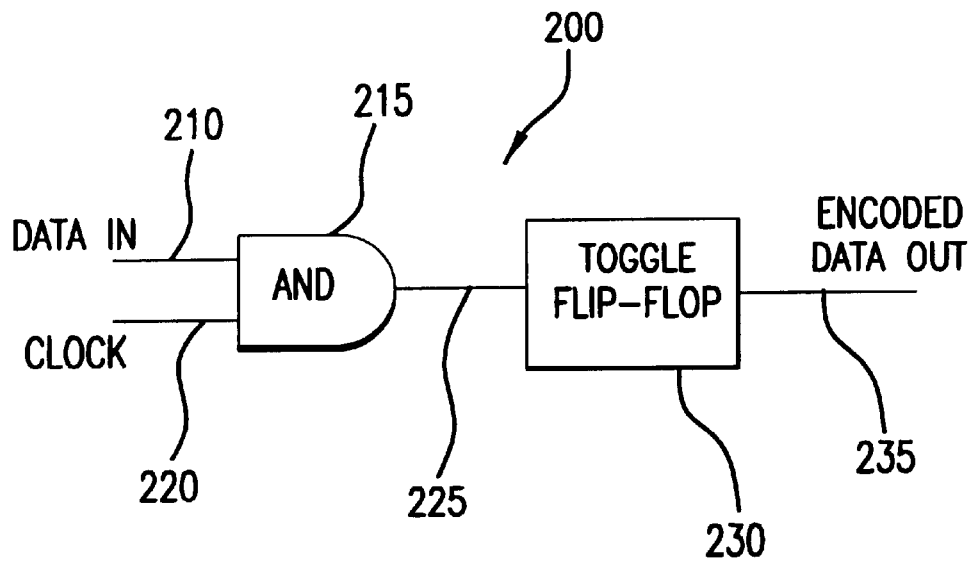
FIG. 2: is a schematic illustration of an exemplary encoding circuit for providing encoded data to a system consistent with the present invention.

Each of the phase modulators receives an associated wavelength and phase modulates the wavelength by an encoded data stream to be transmitted. In this format, a "zero" in the encoded data stream is represented by a change in optical phase from the previous bit, while a "one" is represented by a constant phase. An exemplary encoder 200 for converting NRZ-OOK data into the encoded data is illustrated in FIG. 2. For simplicity and ease of explanation, the invention will be described herein in connection with NRZ-OOK type input data. It is to be understood, however, that the invention is applicable to a variety of other data formats, e.g. RZ-OOK.

Figure 3:
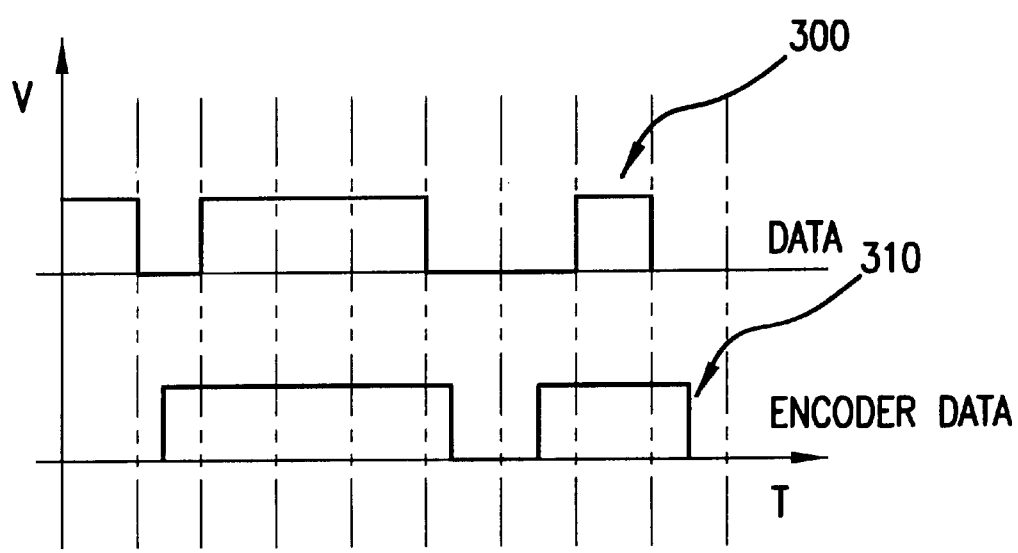
FIG. 3: is a timing diagram illustrating exemplary input data and encoded data for a system consistent with the present invention.

In the illustrated exemplary embodiment, NRZ-OOK data is provided at a first input 210 of an AND gate 215 and a clock signal is provided at a second input 220 of the AND gate. The output 225 of the AND gate is provided as an input to a toggle flip-flop 230, and the encoded data is provided at the output 235 of the flip-flop. FIG. 3 is an exemplary timing diagram illustrating the relationship between the NRZ-OOK data and the associated encoded data for a random sequence of bits. As shown, the encoder converts the NRZ-OOK into encoded data containing amplitude transitions at each "zero" and a constant level at each "one".

With reference still to FIG. 1, the output of each phase modulator 118-1, 118-2 . . . 118-N is provided on an optical path to a first port of an associated, conventional optical circulator 120-1, 120-2 . . . 120-N, respectively. Each phase-modulated channel exits onto an optical path coupled to a second port of its associated optical circulator, and impinges on an associated transmitter filter 122-1, 122-2 . . . 122-N, respectively. Each filter is configured to reflect signals in a filter reflectance band centered on the carrier wavelength for the channel associated therewith, and to transmit signals outside of the filter reflectance band. The filter may also be configured to maintain the linear polarization of phase modulator output. A variety of configurations for maintaining linear polarization are known in the art.

Phase modulation of the encoded data results in frequency domain signal components of the optical channels that are outside of the associated filter reflectance bands. These components are attenuated by the filter. Thus, the filters 122-1, 122-2 . . . 122-N serve to amplitude modulate the phase modulated signal from the associate phase modulators, and to band-limit the optical spectrum of the associated channel.

Figure 4:
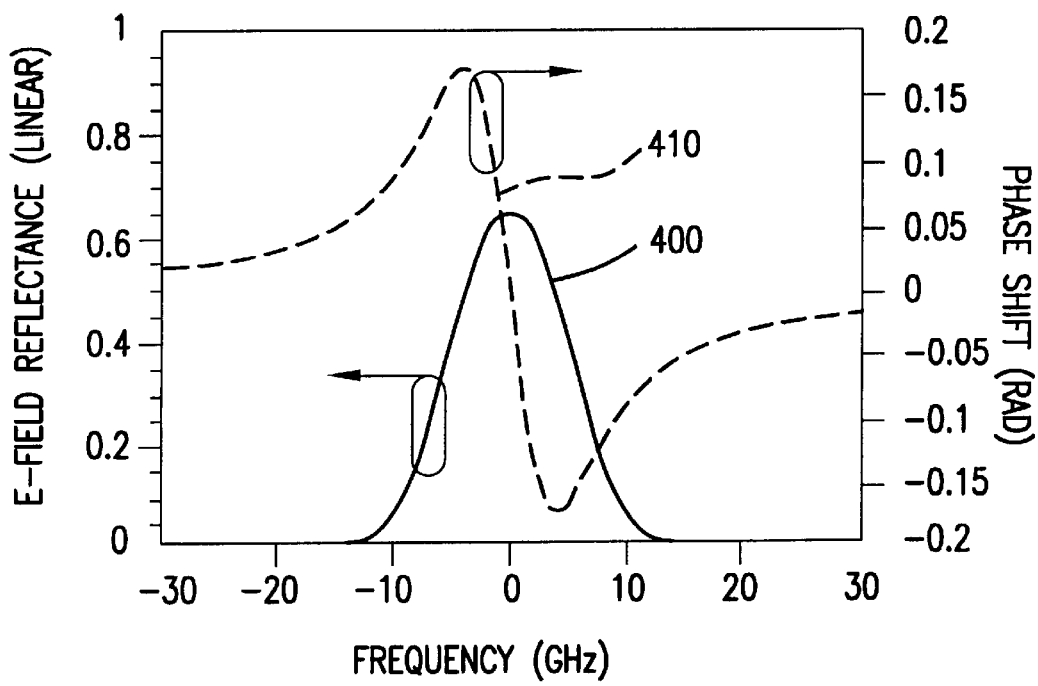
FIG. 4: illustrates exemplary reflectance and phase characteristics of an optical filter for use in a system consistent with the present invention.

Exemplary reflectance 400 and phase 410 characteristics for a filter consistent with the invention are illustrated in FIG. 4. Those skilled in the art will recognize that both the phase and amplitude of the filter output impact the resulting data signal. It has been found that a Super Gaussian filter shape is particularly useful for optimizing both the amplitude and phase response of the filter. As shown in FIG. 4, a filter consistent with the invention may exhibit a reflectance band of approximately 20 GHz, while imposing a phase shift less than about +/−0.2 radians, e.g. only about +/−0.17 radians, over the reflectance band.

A filter exhibiting the reflectance and phase characteristics illustrated in FIG. 4 may be realized by in in-fiber Bragg grating having reflectance and phase characteristics represented by the following Super Gaussian functions (in the electric field sense):

$$r = 0.65 \cdot e^{\left(\frac{f}{6.9 \cdot 10^9}\right)^{2.3}} \quad \phi = -0.33 \frac{f}{5.1 \cdot 10^9} \frac{1}{1 + \left(\frac{f}{5.1 \cdot 10^9}\right)^{2.7}}$$

where r is the filter reflectance and $\phi$ is the filter phase for an optical frequency offset by f from the carrier frequency. It is to be understood, however, the present invention is not limited to the use of Bragg gratings. In fact a variety of filter configurations, e.g. an interference filter or a Mach-Zehnder interferometer, may be provided.

Figure 5:
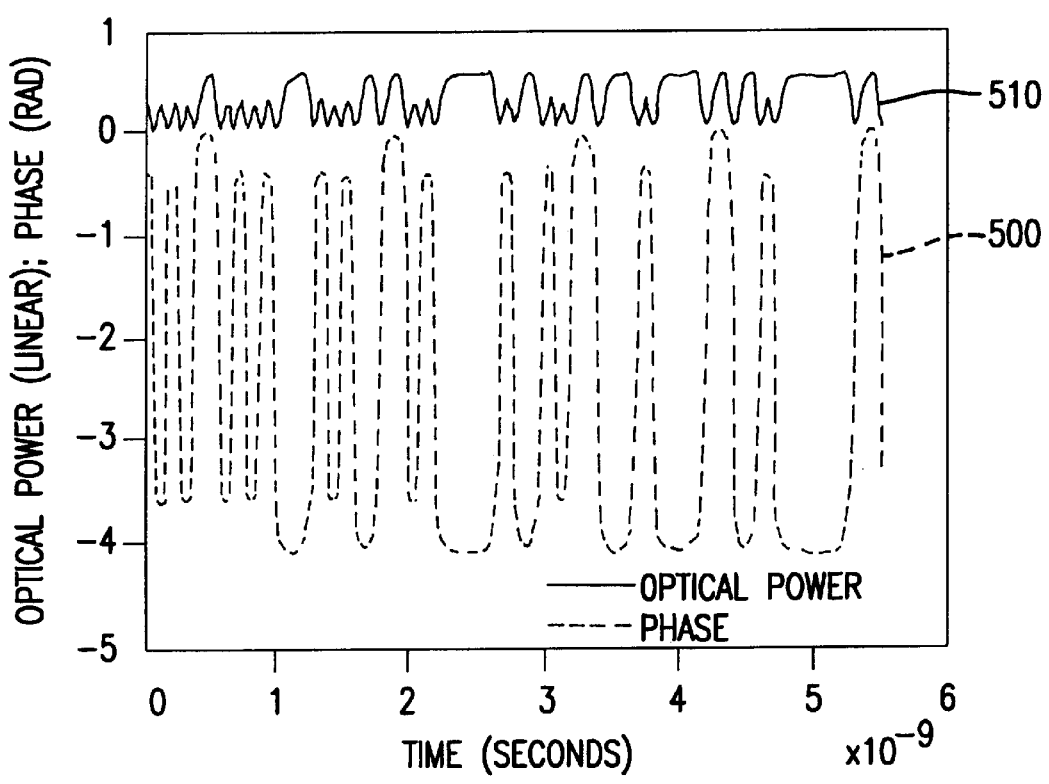
FIG. 5: illustrates optical signal power and phase characteristics for a random sequence of bits at the output of an exemplary transmitter filter in a system consistent with the invention.

FIG. 5 illustrates the optical signal power 510 and phase 500 characteristics for a random sequence of bits reflected by a transmitter filter in a system consistent with the invention. The phase characteristic 500 indicates the occurrence of a "zero" with a phase change and a "one" with constant phase. Amplitude modulation of the optical signal in the optical power characteristic 510 resulting from the filter is also illustrated.

The reflected output of each filter 122-1, 122-2 . . . 122-N is coupled to a second port of the associated optical circulator 120-1, 120-2 . . . 120-N, respectively, which circulates the signal to a third circulator port. In the illustrated exemplary embodiment, the third ports of circulators 120-1, 120-3 . . . 120-N-1 are coupled to associated input ports of a first combiner 124, e.g. an odd channel combiner. The third ports of circulators 120-1, 120-3 . . . 120-N-1 are coupled to the input ports of a second combiner 126, e.g. an even channel combiner. The odd channel combiner combines the odd channels, in a known manner, onto a single optical path 128, and the even combiner combines the even channels onto single optical path 130. A variety of optical combiner configurations are well known to those skilled in the art. In one embodiment, however, the combiners may be configured as polarization maintaining combiners that maintain the linear polarization of the filter outputs.

The outputs of the combiners on paths 128 and 130 are coupled to the input of an aggregate combiner 132, which combines the odd and even channels onto the fiber span 114. In one embodiment, the aggregate combiner may be implemented as a polarization combiner, producing orthogonally interleaved odd and even channels on the fiber span. Various aggregate combiners, including polarization combiner configurations, are known in the art.

The transmitted channels propagate over the fiber span 114, which may include one or more optical amplifiers or other components as necessary. At the receiving node 114, the transmitted channels impinge on a conventional splitter 134, which splits the received signal into N replicas in a known manner. Each of the N replicas is coupled to a first port of an associated optical circulator 136-1 . . . 136-N, which circulates the replica to an associated receiver filter 138-1 . . . 138-N.

The receiver filters 138-1 . . . 138-N may have a configuration substantially identical to the transmitter filters 122-1 . . . 122-N, and are configured to reflect optical channels within a reflectance band centered on an associated one of the transmitted optical channels. All other channels are attenuated by the filter. Receiver filter 138-1, for example, may be configured to reflect λ1, and receiver filter 138-N may be configured to reflect λN. Thus, the receiver filters simultaneously perform further amplitude modulation of the associated channel, optical noise band limiting, and wavelength channel selection.

The channel reflected from each receiver filter 138-1 . . . 138-N is coupled to a second port of its associated circulator 136-1 . . . 136-N, respectively, and circulated to a third port of the circulator. Each third circulator port is coupled to a detector 140-1 . . . 140-N associated with the channel emanating from the port. The detector is configured to photodetect the channel reflected by the associated filter, and convert the same to an electrical signal. Photodetector configurations for achieving this optical to electrical conversion are well known. The detector reconstructs the encoded data from the received channel and reconstructs the NRZ-OOK data from the encoded data.

Advantageously, the combination of optical phase modulation and transmitter optical filtering produces a combined phase and amplitude modulated signal with a reduced spectral width, thereby increasing spectral efficiency. Further, dispersion tolerance for a given bit rate is also increased. For example, assuming 10 GB/s input data, a phase modulation depth of 1.3 p, and identical transmitter and receiver filter shapes described by Super-Gaussian functions, a spectral efficiency 1.6 times higher than that for conventional NRZ-OOK modulation may be achieved assuming linearly aligned polarization for all channels. This can translate to a spectral efficiency of 0.7 bits/s/Hz.

Further spectral efficiency improvements may be achieved in an embodiment wherein the transmitter filters and odd and even channel combiners are configured to preserve the linear polarization of the phase modulator outputs and the aggregate combiner is configured as polarization combiner, producing orthogonally interleaved odd and even channels on the output path. In such an embodiment, spectral efficiency may be increased to 1 bit/s/Hz. Additional spectral efficiency improvement may be achieved by configuring the splitter at the receiver node with a polarization tracking circuit for selectively separating orthogonally polarized channels propagating from the transmitter node. Such polarization tracking circuits are known in the art.

Figure 6:
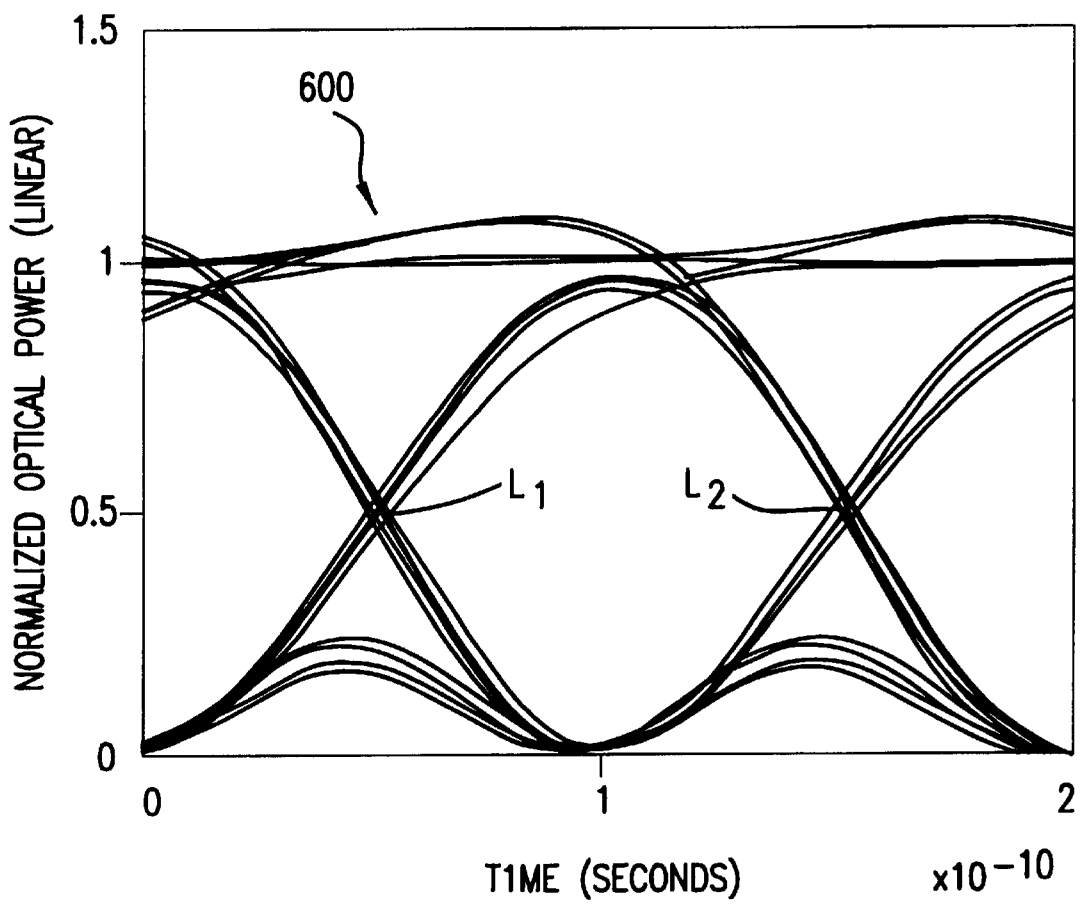
FIG. 6: illustrates an exemplary eye-diagram for a received optical signal in a system consistent with the invention.

Turning to FIG. 6, there is illustrated an exemplary eye-diagram for an optical signal reflected from a receiver filter in a system consistent with the invention. Those skilled in the art will recognize that an eye diagram may be observed on an oscilloscope by monitoring a receiver filter output on the vertical input of the oscilloscope and triggering on the data clock. Key features of an eye diagram include the crossing points C1, C2, useable eye width (i.e. the time distance on the horizontal scale between points C1 and C2) and usable eye height (voltage). In an ideal received signal, the crossing points would be centered and symmetrical, and the open area would be as large as possible. The illustrated eye diagram 600 shows that criteria achieved in the received signal for a system 100 consistent with the invention. Thus, in addition to high spectral efficiency, the present invention results in a readily detectable received signal.

There is thus provided a system and method utilizing phase modulation in conjunction with optical filtering of individual channels at the transmitter to achieve high spectral efficiency in multi-wavelength optical communication systems. The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An optical device comprising:
a plurality of phase modulators, each of which being configured to provide an associated phase modulated optical signal; and
a plurality of optical filters, each of which for receiving an associated one of said optical signals and being configured to amplitude modulate said associated one of said optical signals to provide an optical filter output signal,
wherein each said filter comprises an optical fiber Bragg grating.

2. An optical device comprising:
a plurality of phase modulators, each of which being configured to provide an associated phase modulated optical signal; and
a plurality of optical filters, each of which for receiving an associated one of said optical signals and being configured to amplitude modulate said associated one of said optical signals to provide an optical filter output signal,
wherein each said filter exhibits an amplitude response defined by a Super Gaussian function.

3. An optical device comprising:
a plurality of phase modulators, each of which being configured to provide an associated phase modulated optical signal; and
a plurality of optical filters, each of which for receiving an associated one of said optical signals and being configured to amplitude modulate said associated one of said optical signals to provide an optical filter output signal,
wherein each said filter exhibits a reflectance characteristic in accordance with:

$$r = 0.65 \cdot e^{\left(\frac{f}{6.9 \cdot 10^9}\right)^{2.3}}$$

where r is the filter reflectance for an associated phase modulated optical signal having an optical frequency offset by f from a carrier frequency.

4. An optical device comprising:
a plurality of phase modulators, each of which being configured to provide an associated phase modulated optical signal; and
a plurality of optical filters, each of which for receiving an associated one of said optical signals and being configured to amplitude modulate said associated one of said optical signals to provide an optical filter output signal,
wherein each said filter exhibits a phase response exhibiting a phase variation of an associated one of said filter output signals of less than about +/−0.2 radians.

5. An optical device comprising:
a plurality of phase modulators, each of which being configured to provide an associated phase modulated optical signal; and
a plurality of optical filters, each of which for receiving an associated one of said optical signals and being configured to amplitude modulate said associated one of said optical signals to provide an optical filter output signal,
wherein each said filter exhibits a phase response in accordance with:

$$\phi = -0.33 \frac{f}{5.1 \cdot 10^9} \frac{1}{1 + \left(\frac{f}{5.1 \cdot 10^9}\right)^{2.7}}$$

where $\phi$ is the filter phase for an associated phase modulated optical signal having an optical frequency offset by f from a carrier frequency.

6. An optical device comprising:
a plurality of phase modulators, each of which being configured to provide an associated phase modulated optical signal; and
a plurality of optical filters, each of which for receiving an associated one of said optical signals and being configured to amplitude modulate said associated one of said optical signals to provide an optical filter output signal,
wherein each said phase modulated optical signal is phase modulated based on an associated encoded data signal representing an associated NRZ-OOK formatted data signal.

7. An optical device according to claim 6, wherein each said encoded signal comprises an amplitude transition corresponding to each zero in said associated NRZ-OOK data signal and a constant level corresponding to each one in said associated NRZ-OOK data signal.

8. An optical device comprising:
a plurality of phase modulators, each of which being configured to provide an associated phase modulated optical signal;
a plurality of optical filters, each of which for receiving an associated one of said optical signals and being configured to amplitude modulate said associated one of said optical signals to provide an optical filter output signal; and
a plurality of optical circulators, each said circulator comprising a first port for receiving an associated one of said optical signals, a second port coupled to an associated one of said optical filters.

9. An optical device according to claim 8, said device further comprising at least one optical combiner having a plurality of inputs, each of said inputs being coupled to an associated third port of an associated one of said optical circulators for receiving an associated one of said filter output signals, said combiner being configured to provide said plurality of filter output signals on an optical signal path.

10. An optical communication system comprising:
a plurality of phase modulators, each of which being configured to provide an associated phase modulated optical signal representing an associated data signal;
a plurality of transmitting optical filters, each of which for receiving an associated one of said optical signals and being configured to amplitude modulate said associated one of said optical signals as a transmitting filter output signal;
first and second optical combiners, said first optical combiner being configured to receive a first group of said transmitting filter output signals and provide said first group of said transmitting filter output signals on a first optical signal path, said second optical combiner being configured to receive a second group of said transmitting filter output signals and provide said second group of said transmitting filter output signals on a second optical signal path;
an aggregate optical combiner, said aggregate optical combiner coupled to said first and second optical paths and configured to receive said first and second groups of transmitting filter output signals and combine said first and second groups to produce an aggregate signal; and
a plurality of receiving optical filters, each of which being configured to receive at least a portion of said aggregate signal and to provide a receiver filter output signal comprising an associated one of said transmitting filter output signals.

11. An optical communication system according to claim 10, said device further comprising a plurality of detectors, each of which for receiving an associated receiver filter output signal and being configured to reconstruct an associated one of said data signals from said associated receiver filter output signal.

12. An optical communication system according to claim 10, said device further comprising a splitter for receiving said aggregate signal, said splitter being configured to split said aggregate signal into a plurality of replicas, each of said replicas being coupled to an associated one of said receiving optical filters.

13. An optical device according to claim 10, wherein each said transmitting optical filter and receiving optical filter exhibits an amplitude response defined by a Super Gaussian function.

14. An optical device according to claim 10, wherein each said transmitting optical filter exhibits a reflectance characteristic in accordance with:

$$r = 0.65 \cdot e^{\left(\frac{f}{6.9 \cdot 10^9}\right)^{2.3}}$$

where r is a filter reflectance for an associated phase modulated optical signal having an optical frequency offset by f from a carrier frequency.

15. An optical device according to claim 10, wherein each said transmitting optical filter exhibits a phase response exhibiting a phase variation of an associated one of said filter output signals of less than about +/−0.2 radians.

16. An optical device according to claim 10, wherein each said transmitting optical filter exhibits a phase response substantially in accordance with:

$$\phi = -0.33 \frac{f}{5.1 \cdot 10^9} \frac{1}{1 + \left(\frac{f}{5.1 \cdot 10^9}\right)^{2.7}}$$

where φ is the filter phase for an associated phase modulated optical signal having an optical frequency offset by f from a carrier frequency.

17. An optical device according to claim 10, wherein each said associated data signal is an encoded data signal representing an associated NRZ-OOK data signal.

18. An optical device according to claim 17, wherein each said encoded data signal comprises an amplitude transition corresponding to each zero in said associated NRZ-OOK data signal and a constant level corresponding to each one in said associated NRZ-OOK data signal.

19. A method of modulating a plurality of optical wavelengths in a wavelength division multiplexed optical communication system, the method comprising:
  phase modulating each said wavelength based on an associated data signal to provide an associated phase modulated signal; and
  coupling each said phase modulated signal to an associated optical filter configured to amplitude modulate said phase modulated optical signal based on an amplitude response of said filter,
  wherein each said filter comprises an optical fiber Bragg grating.

20. A method of modulating a plurality of optical wavelengths in a wavelength division multiplexed optical communication system, the method comprising:
  phase modulating each said wavelength based on an associated data signal to provide an associated phase modulated signal; and
  coupling each said phase modulated signal to an associated optical filter configured to amplitude modulate said phase modulated optical signal based on an amplitude response of said filter,
  wherein each said amplitude response is defined by a Super Gaussian function.

21. A method of modulating a plurality of optical wavelengths in a wavelength division multiplexed optical communication system, the method comprising:
  phase modulating each said wavelength based on an associated data signal to provide an associated phase modulated signal; and
  coupling each said phase modulated signal to an associated optical filter configured to amplitude modulate said phase modulated optical signal based on an amplitude response of said filter,
  wherein each said amplitude response is accordance with:

$$r = 0.65 \cdot e^{\left(\frac{f}{6.9 \cdot 10^9}\right)^{2.3}}$$

where r is the filter reflectance for an associated phase modulated optical signal having an optical frequency offset by f from a carrier frequency.

22. A method of modulating a plurality of optical wavelengths in a wavelength division multiplexed optical communication system, the method comprising:
  phase modulating each said wavelength based on an associated data signal to provide an associated phase modulated signal; and
  coupling each said phase modulated signal to an associated optical filter configured to amplitude modulate said phase modulated optical signal based on an amplitude response of said filter,
  wherein each said filter exhibits a phase response in accordance with:

$$\phi = -0.33 \frac{f}{5.1 \cdot 10^9} \frac{1}{1 + \left(\frac{f}{5.1 \cdot 10^9}\right)^{2.7}}$$

where φ is the filter phase for an associated phase modulated optical signal having an optical frequency offset by f from a carrier frequency.

23. A method of modulating a plurality of optical wavelengths in a wavelength division multiplexed optical communication system, the method comprising:
  phase modulating each said wavelength based on an associated data signal to provide an associated phase modulated signal; and
  coupling each said phase modulated signal to an associated optical filter configured to amplitude modulate said phase modulated optical signal based on an amplitude response of said filter,
  wherein each said associated data signal is an encoded data signal representing an associated NRZ-OOK data signal.

24. A method according to claim 23, wherein each said encoded data signal comprises an amplitude transition corresponding to each zero in said associated NRZ-OOK data signal and a constant level corresponding to each one in said associated NRZ-OOK data signal.

25. An optical device according to claim 10, wherein each said transmitting optical filter comprises an optical fiber Bragg grating.

26. An optical communication system according to claim 10, wherein said aggregate optical combiner is a polarization combiner producing orthogonally interleaved odd and even channels corresponding to said first and second groups of transmitting filter output signals.

* * * * *